(12) United States Patent
Cok (10) Patent No.: US 8,439,275 B2
(45) Date of Patent: May 14, 2013

(54) MULTI-RESOLUTION OPTICAL CODES

(75) Inventor: Ronald Steven Cok, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 127 days.

(21) Appl. No.: 13/080,824

(22) Filed: Apr. 6, 2011

(65) Prior Publication Data

US 2012/0256007 A1  Oct. 11, 2012

(51) Int. Cl.
*G06K 19/051* (2006.01)
(52) U.S. Cl.
USPC ............................. 235/494; 235/462.01
(58) Field of Classification Search ............ 235/494, 235/462.01, 462.05, 462.09–11, 462.45, 235/472
See application file for complete search history.

(56) References Cited

U.S. PATENT DOCUMENTS

| | | | |
|---|---|---|---|
| 6,726,104 B2 | 4/2004 | Schuessler et al. | |
| 7,273,175 B2 | 9/2007 | Zhao et al. | |
| 7,520,427 B2 * | 4/2009 | Boyd | 235/382 |
| 7,702,162 B2 * | 4/2010 | Cheong et al. | 382/232 |
| 7,835,037 B2 | 11/2010 | Koide | |
| 7,841,531 B2 | 11/2010 | Onogi | |
| 7,886,978 B2 | 2/2011 | Ofek et al. | |
| 8,186,572 B2 * | 5/2012 | Herzig | 235/375 |
| 2007/0143737 A1 | 6/2007 | Huang et al. | |
| 2007/0284441 A1 * | 12/2007 | Walczyk et al. | 235/383 |

* cited by examiner

*Primary Examiner* — Daniel St. Cyr
(74) *Attorney, Agent, or Firm* — Raymond L. Owens (57) ABSTRACT

A machine-readable optical code formed on a substrate includes a first code having a plurality of first elements formed on or in the substrate, the first code specifying first information, wherein one or more of the first elements includes a second code on or in the substrate, the second code including a plurality of second elements specifying second information, and wherein the first code and the second code are machine-readable optical codes.

22 Claims, 10 Drawing Sheets

MULTI-RESOLUTION OPTICAL CODES

CROSS-REFERENCE TO RELATED APPLICATION

Reference is made to commonly assigned U.S. patent application Ser. No. 13/080,846 filed Apr. 6, 2011, entitled "Decoding Multi-Resolution Optical Codes" by Ronald S. Cok, the disclosure of which is incorporated herein.

FIELD OF THE INVENTION

The present invention relates to optical machine-readable codes.

BACKGROUND OF THE INVENTION

Machine-readable optical codes have been in use for many years. The ubiquitous one-dimensional barcode has been used for product tracking and to automate purchases. For example, one-dimensional barcodes are in widespread use for managing point-of-sale purchase transactions using computer-controlled laser scanners.

More recently, two-dimensional codes, also known as matrix barcodes, such as QR ("Quick Response") codes, have become popular. Two-dimensional codes can encode a much greater quantity of information than one-dimensional codes. The information encoded in such codes is readily accessed through digital photographs of the codes that are processed by application software found in mobile communication devices such as cell phones having digital signal processing and internet communication access. QR codes are frequently employed in conjunction with product advertising to provide an internet URI website link with information about the product advertised.

Figure 3:
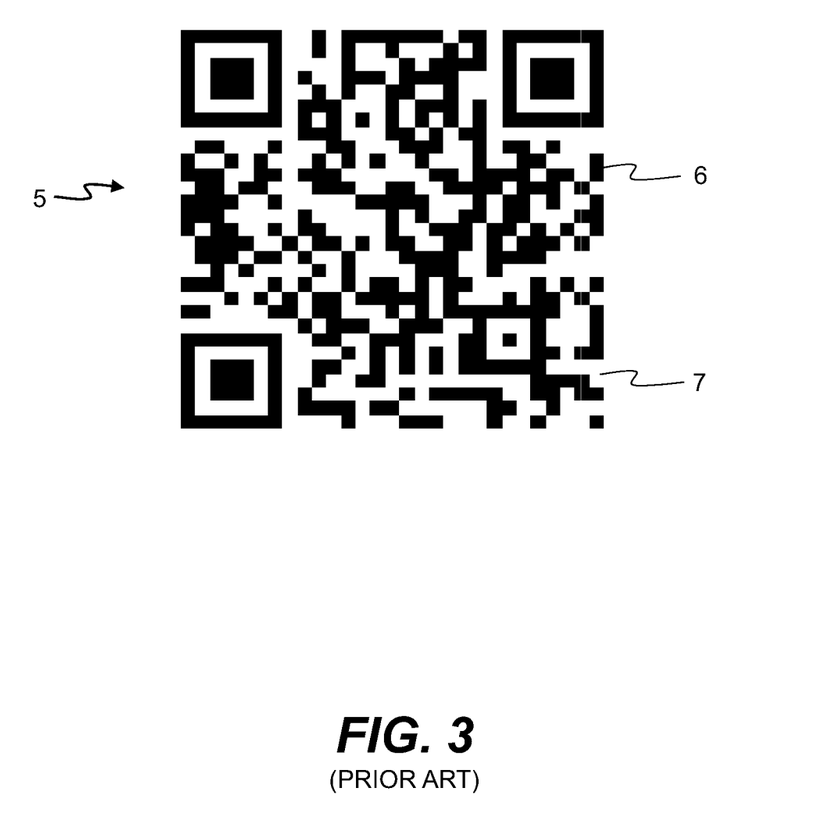
FIG. 3 is a prior-art representation of a two-dimensional optical matrix QR barcode.

Optical bar codes are typically intended to be visually observable by humans, so that humans can find the codes and take appropriate action to access encoded information or otherwise use the codes. In contrast, steganographic information is designed to be hidden within an image. The present application addresses optical codes that are intended to be observable to humans and does not address steganographic codes. Referring to FIG. 3, a matrix barcode 5 of the prior art is illustrated with dark elements 6 and light elements 7 forming black modules on a white background. As used herein, the term matrix barcode is used synonymously with two-dimensional code. A QR code is an example of a matrix barcode.

Figure 8:
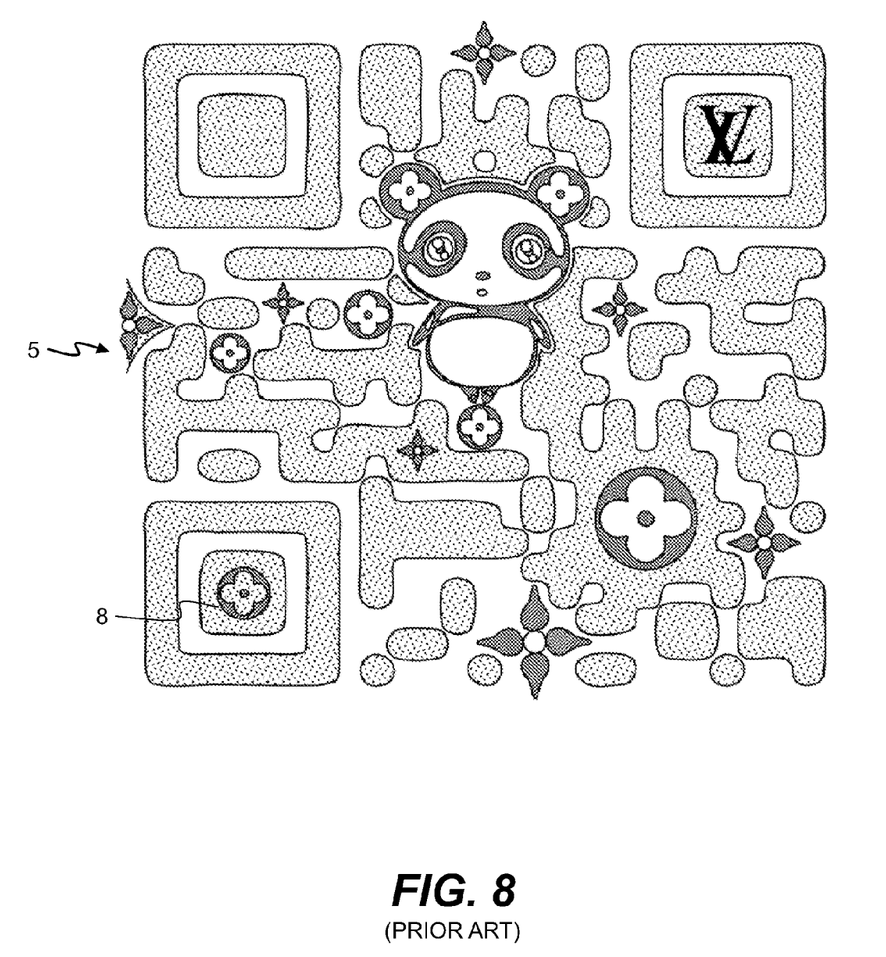
FIG. 8 is a prior-art representation of a two-dimensional optical matrix QR barcode with graphic elements.

The formation, scanning, and decoding of one- and two-dimensional bar codes is known in the art. For example, U.S. Pat. No. 7,273,175 describes a method, apparatus and a storage medium for locating QR codes. U.S. Pat. No. 7,702,162 describes a mixed code including a first code image region and a second code image region. An image processing apparatus including an optical reader and image processing hardware is discussed in U.S. Pat. No. 7,835,037. U.S. Pat. No. 7,841,531 discloses a camera operating system and matrix decoding device. U.S. Pat. No. 7,886,978 describes techniques for decoding images of barcodes. U.S. Pat. No. 6,726,104 discloses machine-readable optical symbols with areas of different spectral characteristics printed on different printers with different dot pitches. As shown in FIG. 8, it is also known to provide graphic elements 8 in a machine-readable optical code 5.

Although bar codes are in widespread use, there are improvements that can be made to such codes to increase the amount of information stored in the codes and to make the codes accessible to human observers under desired conditions. There is a need, therefore, for an improved machine-readable optical code that can provide additional information.

SUMMARY OF THE INVENTION

In accordance with the present invention, there is provided a machine-readable optical code formed on a substrate, comprising:

a first code including a plurality of first elements formed on or in the substrate, the first code specifying first information;

wherein one or more of the first elements includes a second code on or in the substrate, the second code including a plurality of second elements specifying second information; and wherein the first code and the second code are machine-readable optical codes.

The present invention disclosed herein provides a code that encodes an increased amount of information that is accessible at a variety of resolutions and can be determined at a variety of distances from a substrate on which a code is formed. The invention is useful in venues using large substrates, such as posters, billboards, and large electronic displays to provide information with a variety of detail to interested customers.

These, and other, attributes of the present invention will be better appreciated and understood when considered in conjunction with the following description and the accompanying drawings. It should be understood, however, that the following description, although indicating embodiments of the present invention and numerous specific details thereof, is given by way of illustration and not of limitation. For example, the summary descriptions above are not meant to describe individual separate embodiments whose elements are not interchangeable. Many of the elements described as related to a particular embodiment can be used together with, and interchanged with, elements of other described embodiments. The figures below are not intended to be drawn to any precise scale with respect to relative size, angular relationship, or relative position or to any combinational relationship with respect to interchangeability, substitution, or representation of an actual implementation.

BRIEF DESCRIPTION OF THE DRAWINGS

The above and other features and advantages of the present invention will become more apparent when taken in conjunction with the following description and drawings wherein identical reference numerals have been used to designate identical features that are common to the figures, and wherein.

The codes illustrated in this application are representative and not intended to encode any specific information.

DETAILED DESCRIPTION OF THE INVENTION

Figure 1:
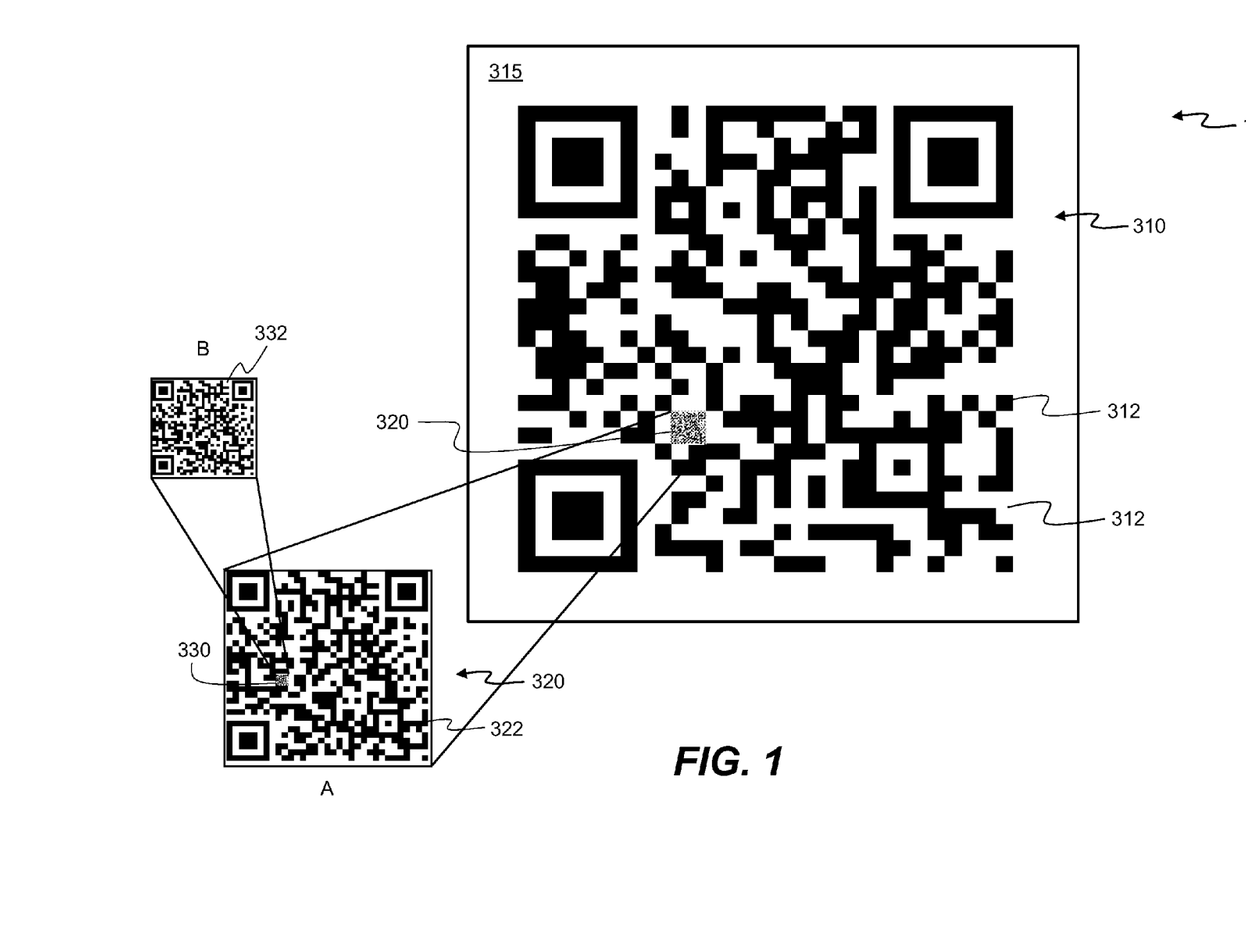
FIG. 1 is a machine readable optical code according to an embodiment of the present invention.

Referring to FIG. 1 according to an embodiment of the present invention, a machine-readable optical code 1 formed on a substrate 315 includes a first code 310 including a plurality of first elements 312 formed on or in the substrate 315, the first code 310 specifying first information. Each first element 312 is the smallest information-carrying structure, for example a bit of information. The first elements 312 are either dark (6 in FIG. 3) or light (7 in FIG. 3). One or more of the first elements 312 includes a second code 320 on or in the substrate 315, the second code 320 including a plurality of second elements 322 specifying second information. The second elements 322 are either dark (6 in FIG. 3) or light (7 in FIG. 3). The first code 310 and the second code 320 are machine-readable optical codes. The second code 320 includes one or more first elements 312 and is a portion of and embedded within the first code 310. According to various embodiments of the present invention, the machine-readable optical code 1 is a multi-level code having a hierarchy of different codes, each capable of encoding different information. Each of the different codes in the hierarchy can have a different resolution. Enlarged portion view A of FIG. 1 illustrates second code 320 in more detail.

Figure 2:
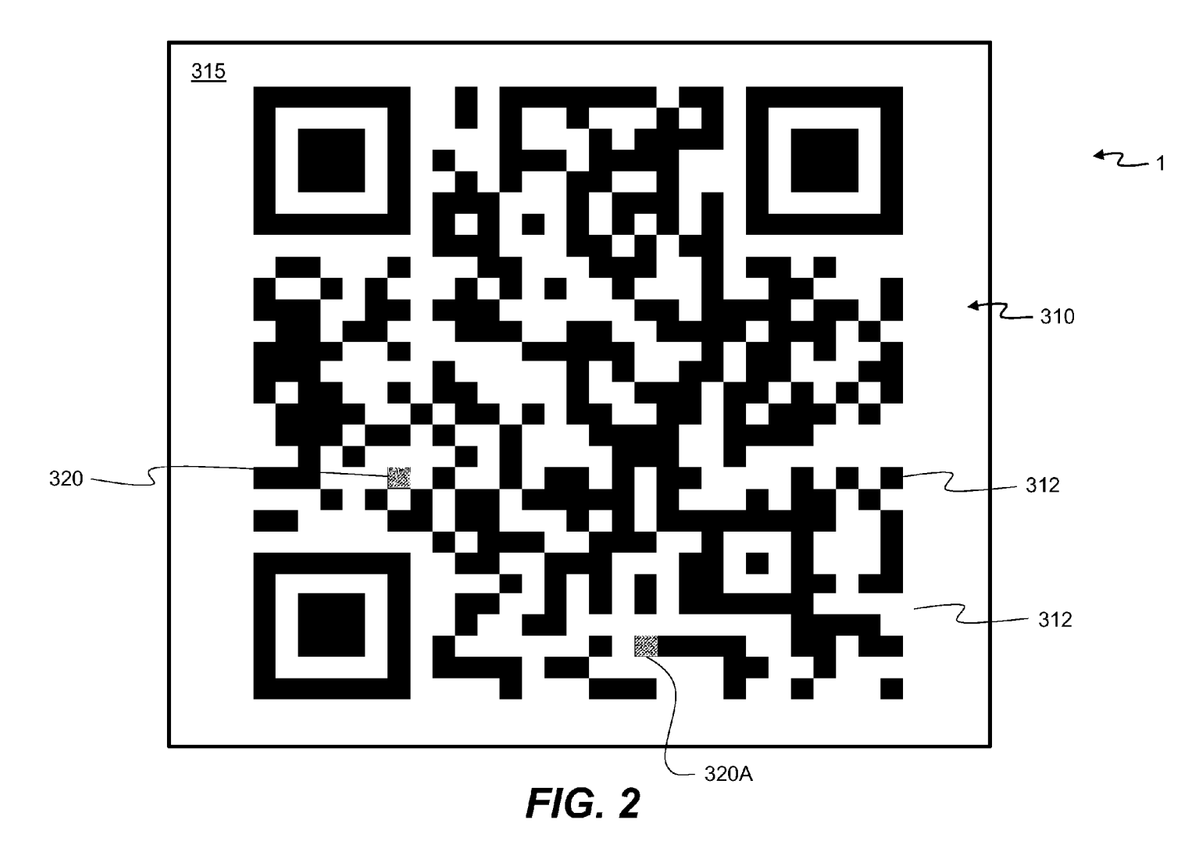
FIG. 2 is a machine readable optical code according to another embodiment of the present invention.

In various embodiments of the present invention, the first code 310 is a one-dimensional barcode, a two-dimensional matrix barcode, or a QR code. In another embodiment, the second code 320 is a one-dimensional barcode, a two-dimensional matrix barcode, or a QR code. In an embodiment, each of the first and second codes 310, 320 have the same format, so that they have the same structure and are printed, displayed or read using the same hardware and software tools. For example, as shown in FIGS. 1 and 2, the first code 310, second code 320, and a third code 330 are QR codes.

In one embodiment of the present invention, the substrate 315 is a printable substrate and the first and second codes 310, 320, and the first and second elements 312, 322 are printed on the substrate 315. In another embodiment of the present invention, machine-readable optical code 1 formed on the substrate 315 includes a display and the substrate 315 is a part of the display. In this embodiment, the first and second codes 310, 320 and the first and second elements 312, 322 are displayed on the display.

As shown in FIG. 1, the second code 320 is formed in a plurality of contiguous first elements 312. In the example of FIG. 1, the second code 320 is made up of four adjacent and contiguous first elements 312 arranged in a two-by-two square matrix. Referring to FIG. 2, in an alternative embodiment, the second code 320 is made up of a single one of the first elements 312. As shown in FIG. 2, the machine-readable optical code 1 can include a plurality of second codes 320, 320A in or on the substrate 315, each second code 320 formed from different one or more first elements 312.

In a further embodiment of the present invention illustrated in FIG. 1, the machine-readable optical code 1 further includes the third code 330 including a third elements 332 formed on or in the substrate 315, the third code 330 specifying third information, wherein the third code 330 is a machine-readable optical code 1. One or more second elements 322 includes the third code 330 on the substrate 315. Enlarged portion view B of FIG. 1 illustrates third code 330 in more detail.

Because the second code 320 is embedded in the first code 310, the second elements 322 have a higher resolution than the first elements 312 and are formed at a higher resolution. As intended herein, elements formed at a higher resolution have a greater number of distinguishable elements per linear distance or per area. When forming the elements, a common forming mechanism (e.g. printer, display) is used, capable of e.g. printing or displaying elements at the higher resolution. Alternatively, the first elements 312 can be formed with a first device capable of forming elements at a first resolution and the second elements 322 are formed with a second device capable of forming elements at a second, higher resolution. In one embodiment, the first elements 312 are printed at a higher rate although the second elements 322 are printed with the same device at a slower rate. The rate is the number of elements printed per unit time. By printing at a slower rate, the second elements 322 are printed at a higher resolution.

In one embodiment of the present invention, the first and second information encode related information. For example, the second information can provide more detail on the same topic as the first information.

In an embodiment of the present invention, both the first code 310 and the second code 320 are visually perceptible to a human. In another embodiment, the first code 310 is visually perceptible to a human and the second code 320 is not visually perceptible to a human. For example, the second code 320 is microscopic.

Figure 4:
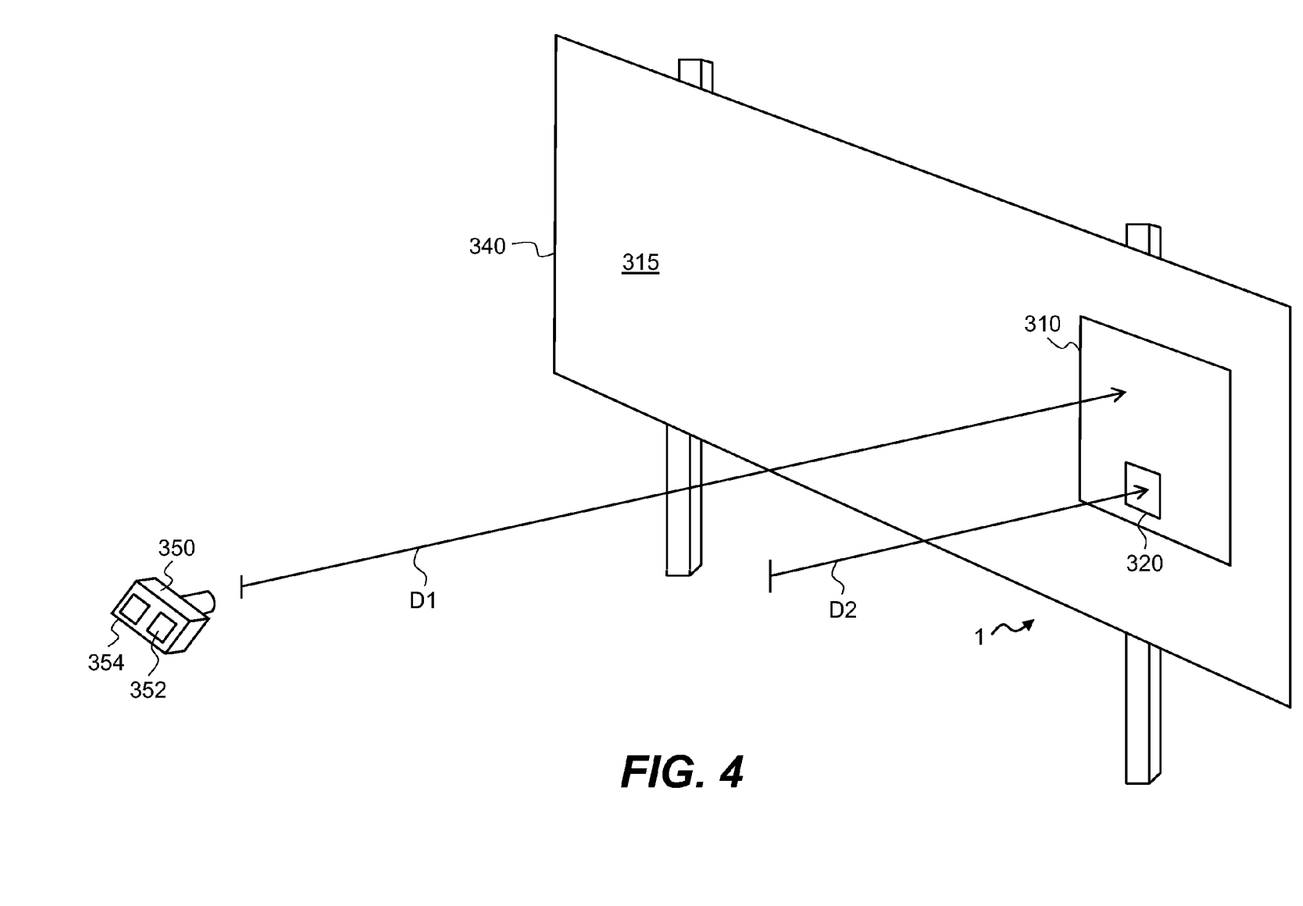
FIG. 4 is a perspective of a billboard having a machine readable optical code and image reader having a processor and display according to an embodiment of the present invention.

The present invention is usefully applied to substrates that are viewed at a variety of distances. For example, as shown in FIG. 4, a billboard 340 having a paper or plastic substrate 315 includes the first code 310 and the second code 320 printed thereon. The first code 310 is recorded from a first distance D1, for example with an image reader 350 such as a digital camera having adequate resolution to distinguish the first elements 312 of the first code 310 but not necessarily having adequate resolution to distinguish the second elements 322 of the second code 320. Thus, in one embodiment, the first code 310 is visually perceptible and machine readable at a first distance D1 and the second code 320 is visually perceptible and machine readable at a second distance D2 less than the first distance D1.

The image record is decoded using known image processing techniques to determine the first information, for example using a processor and user interface 352 on the image reader 350. An alternative image reader 350 is a cellular telephone with an integrated digital camera 350, a processor and user interface 352, and software for decoding recorded optical codes. Other image readers 350 can include laser scanners or linear scanners. Such image readers 350 and recorders are known in the art, as are processors and software for decoding recorded optical codes. If the first information is of interest, for example in conjunction with other information on the billboard 340, another image record is made at a closer distance D2 with the same image reader 350 (or a different image reader). In another embodiment of the present invention, the image reader 350 (for example, a digital camera) has a limited focal range with a differential capability to record the first code 310 and the smaller second code 320. Alternative useful substrates 315 include, without limitation, posters and large displays, especially those in commercial locations. Such billboards, posters, and displays are used for commercial activities, particularly for advertising.

The second code 320 formed in the first element(s) 312 meets the requirements for decoding the first code 310. In particular, the second codes 320 provide one or more distinguishable first elements 312. In many one- or two-dimensional barcodes, each element has a binary state, either light or dark, and is decoded as either light or dark to decode the information in the barcode, for example by comparing the average darkness of the element area to one or more threshold values. The second code 320 is read on average as either a light or a dark first element 312, depending on the information carried in the one or more second elements 322 that form the second code 320. This can limit the second information encoded in the second code 320. However, in reading the first code 310 and determining the value of each first element 312, a discriminator that uses one or more thresholds to select between binary light and dark states is set at such levels that the aggregate lightness or darkness of the second codes 320 is determined to be either dark or light, as desired. For example, the discriminator can set a threshold level so that if only 10% of the area in the first element 312 is dark, the first element 312 is determined to be dark. Moreover, by using image processing software to average the pixel values over the first element area in an image of the first code 310, a more robust and flexible system is provided. Furthermore, for second codes 320 that occupy the locations of more than one first elements 312 (e.g. in a two-by-two square), each section of the second code 320 is decoded separately and differently. In a further embodiment of the present invention, the location of the second code 320 in the first code 310 is determined by matching portions of the second code 320 to first elements 312, so that the first elements 312 are decoded properly. For example, if the second code 320 is determined to be dark, the second code 320 is located in a dark first element 312. If the second code 320 is determined to be light, the second code 320 is located in a light first element 312. If the second code 320 has quadrants that have a light and dark arrangements, the second code 320 is located in a first element area having the same arrangement. In an embodiment, some codes have a greater number of dark elements as the quantity of encoded data increases. In such a case, the embedded codes can include redundant or additional data that controls the element density within a code to control the lightness or darkness of the code with respect to the threshold. In an embodiment of the present invention, the encoded data is selected to make the code light or dark.

The present invention is used to provide information associated with images. For example, in one embodiment the first code 310 is printed in association with an image and the first or second information is relevant to the image. In a further example, the first or second information is provided by image metadata.

Figure 5:
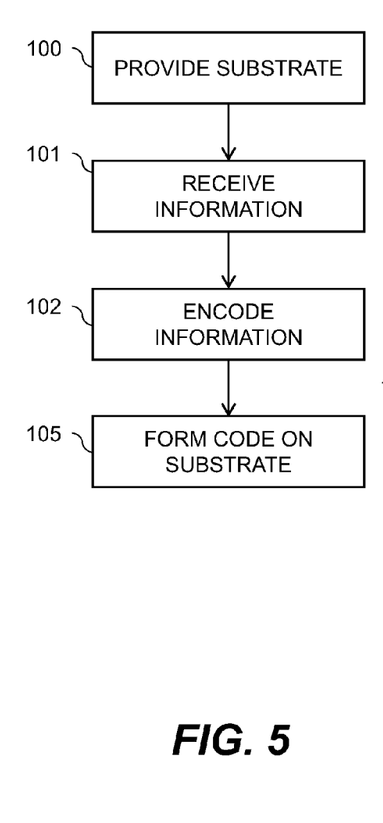
FIG. 5 is a flow diagram according to an embodiment of the present invention.

According to an embodiment of the present invention and referring to FIG. 5, a method of making a machine-readable optical code 1 formed on a substrate 315 (step 100) includes receiving information (step 101), encoding the information (step 102), and forming the machine-readable optical first code 310 including a plurality of first elements 312 on or in the substrate 315 (step 105). The machine-readable optical first code 310 specifies first information. One or more of the first elements 312 form the machine-readable optical second code 320 including a plurality of second elements 322 on the substrate 315, the second code 320 specifying second information. The first code 310 and the second code 320 are machine-readable optical codes.

Figure 6:
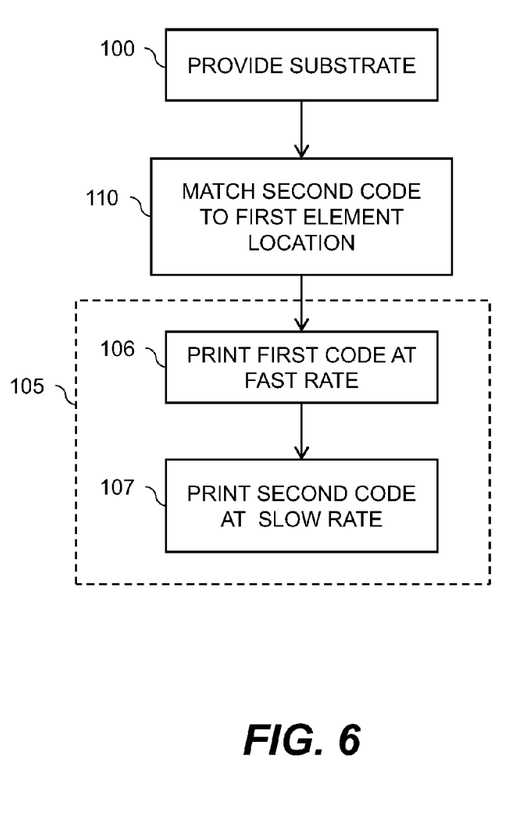
FIG. 6 is a flow diagram according to another embodiment of the present invention.

In a further embodiment illustrated in FIG. 6, the first elements 312 and second elements 322 are printed on the substrate 315 with the same printing device. The first elements 312 are printed (step 106) at a first rate and the second elements 322 are printed (step 107) at a second rate slower than the first rate. The second code 320 is located in first element(s) 312 for which the overall lightness or darkness of the second code 320 is matched to the lightness or darkness of the first element(s) 312 (step 110).

Figure 7:
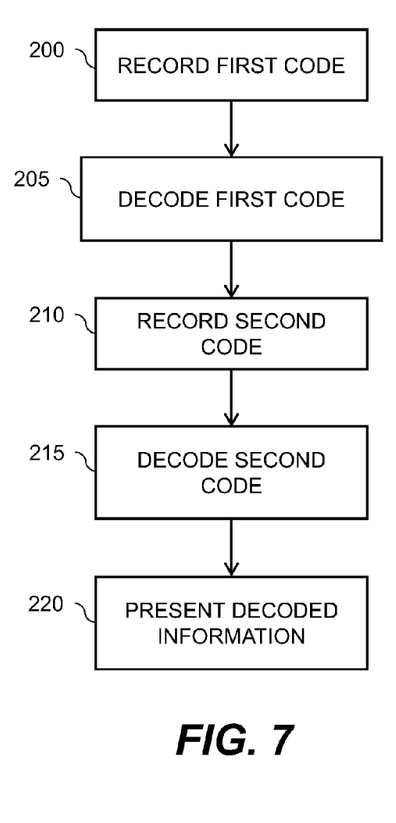
FIG. 7 is a flow diagram according to an alternative embodiment of the present invention.

According to another embodiment of the present invention and referring to FIG. 7, a method of decoding a machine-readable optical code 1 includes using the first image reader 350 to record (step 200) the first code 310 on the substrate 315 to form a first recorded image. The first code 310 specifies first information and includes a plurality of first elements 312 specifying the first information stored within the first code 312. One or more of the first elements 312 form the second code 320 on the substrate 315, the second code 320 specifying second information and including a plurality of second elements 322 specifying the second information encoded within the second code 320. The first code 310 and the second code 320 are machine-readable optical codes. The processor 352 is used to decode (step 205) the first information from the first recorded image. A second image reader 350 is used to record the second code 320 (step 210) to form a second recorded image and the processor 352 is used to decode the second information (step 215) from the second recorded image whereby the machine-readable optical code is decoded. The decoded information is presented (step 220).

The first image reader 350 and the second image reader 350 can be the same image reader 350. Alternatively, the second image reader 350 has a higher magnification than the first image reader 350. In various embodiments, the image reader 350 is an area recorder (for example using an area electronic imager), a linear recorder (for example using a linear electronic imager), or a laser scanner. The image reader 350 can be a digital camera, a cellular telephone that incorporates a digital camera, or a portable computer that incorporates a digital camera. In another embodiment, the decoded information is displayed on a display 354, for example a display associated with the processor 352 or image reader 350. In other embodiments, the processor 352 is a part of the image reader 350. In a further embodiment, the image reader 350, the processor 352, and the display 354 are parts of a common mobile communication device, such as a cellular telephone or smart phone.

In one embodiment, the first code 310 is recorded at a first resolution and the second code 320 is recorded at a second resolution higher than the first resolution. Alternatively, the first code 310 is recorded at a first distance D1 and the second code 320 is recorded at a second distance D2 less than the first distance D1. Thus, in an embodiment, a method of the present invention further includes visually perceiving the first code 310 at the first distance D1, recording the first code 310, visually perceiving the second code 320 at the second distance D2 less than the first distance D1, and recording the second code 320.

In one embodiment, the first and second codes 310, 320 use the same code format, so the same software tools are used to locate and decode the first and second codes 310, 320. For example, the code format can be a one-dimensional or two-dimensional barcode or matrix code, such as a QR code. Software tools for coding or decoding such codes are known in the art.

Figure 9:
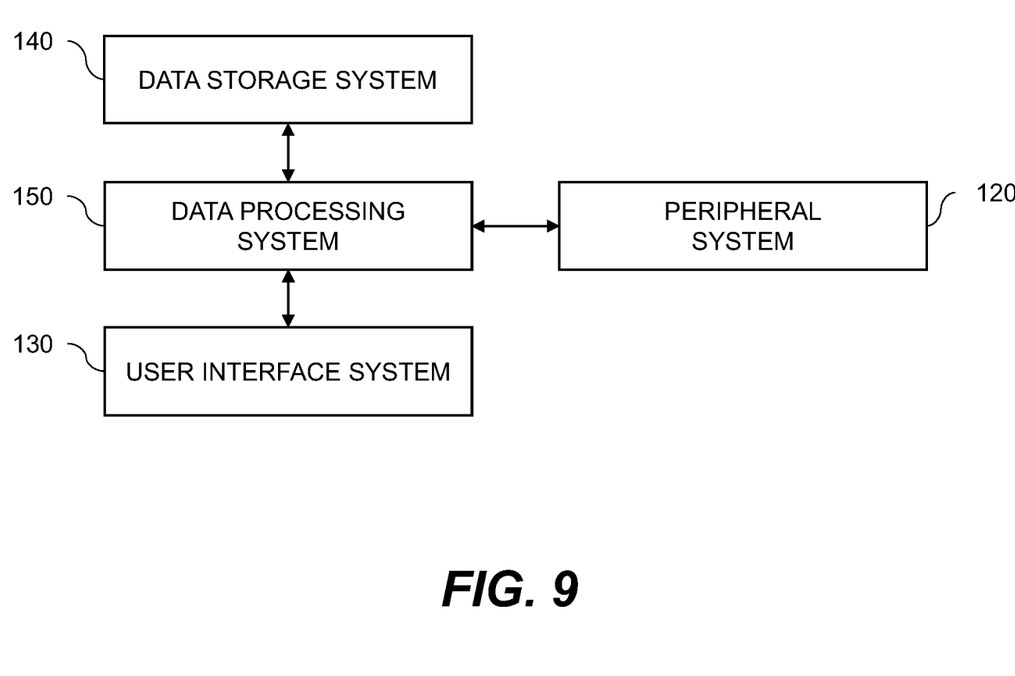
FIG. 9 is a schematic of a system useful in various embodiments of the present invention.

FIG. 9 is a high-level diagram showing the components of a system useful for practicing various embodiments of the present invention. The system includes a data processing system 150, a peripheral system 120, a user interface system 130, and a data storage system 140. The peripheral system 120, the user interface system 130 and the data storage system 140 are communicatively connected to the data processing system 150.

The data processing system 150 includes one or more data processing devices that implement the processes of the various embodiments of the present invention, including the example processes described herein. The phrases "data processing device" or "data processor" are intended to include any data processing device, such as a central processing unit ("CPU"), a desktop computer, a laptop computer, a mainframe computer, a personal digital assistant, a Blackberry™, a digital camera, a digital picture frame, cellular phone, a smart phone or any other device for processing data, managing data, communicating data, or handling data, whether implemented with electrical, magnetic, optical, biological components, or otherwise.

The data storage system 140 includes one or more processor-accessible memories configured to store information, including the information needed to execute the processes of the various embodiments of the present invention, including the example processes described herein. The data storage system 140 is a distributed processor-accessible memory system including multiple processor-accessible memories communicatively connected to the data processing system 150 via a plurality of computers or devices. On the other hand, the data storage system 140 need not be a distributed processor-accessible memory system and, consequently, can include one or more processor-accessible memories located within a single data processor or device.

The phrase "processor-accessible memory" is intended to include any processor-accessible data storage device, whether volatile or nonvolatile, electronic, magnetic, optical, or otherwise, including but not limited to, registers, caches, floppy disks, hard disks, Compact Discs, DVDs, flash memories, ROMs, and RAMs.

The phrase "communicatively connected" is intended to include any type of connection, whether wired or wireless, between devices, data processors, or programs in which data is communicated. The phrase "communicatively connected" is intended to include a connection between devices or programs within a single data processor, a connection between devices or programs located in different data processors, and a connection between devices not located in data processors. In this regard, although the data storage system 140 is shown separately from the data processing system 150, one skilled in the art will appreciate that the data storage system 140 can be stored completely or partially within the data processing system 150. Further in this regard, although the peripheral system 120 and the user interface system 130 are shown separately from the data processing system 150, one skilled in the art will appreciate that one or both of such systems can be stored completely or partially within the data processing system 150.

The peripheral system 120 can include one or more devices configured to provide digital content records to the data processing system 150. For example, the peripheral system 120 can include digital still cameras, digital video cameras, cellular phones, smart phones, or other data processors. The data processing system 150, upon receipt of digital content records from a device in the peripheral system 120, can store such digital content records in the data storage system 140.

The user interface system 130 can include a mouse, a keyboard, another computer, or any device or combination of devices from which data is input to the data processing system 150. In this regard, although the peripheral system 120 is shown separately from the user interface system 130, the peripheral system 120 can be included as part of the user interface system 130.

The user interface system 130 also can include a display device, a processor-accessible memory, or any device or combination of devices to which data is output by the data processing system 150. In this regard, if the user interface system 130 includes a processor-accessible memory, such memory can be part of the data storage system 140 even though the user interface system 130 and the data storage system 140 are shown separately in FIG. 9. In one embodiment of the present invention, the system of FIG. 9 can be a cellular telephone or digital camera with data processing system (150) for recording images from the incorporated image sensor 39, encoding or decoding the multi-resolution codes described herein, and presenting information on the display 354.

Figure 10:
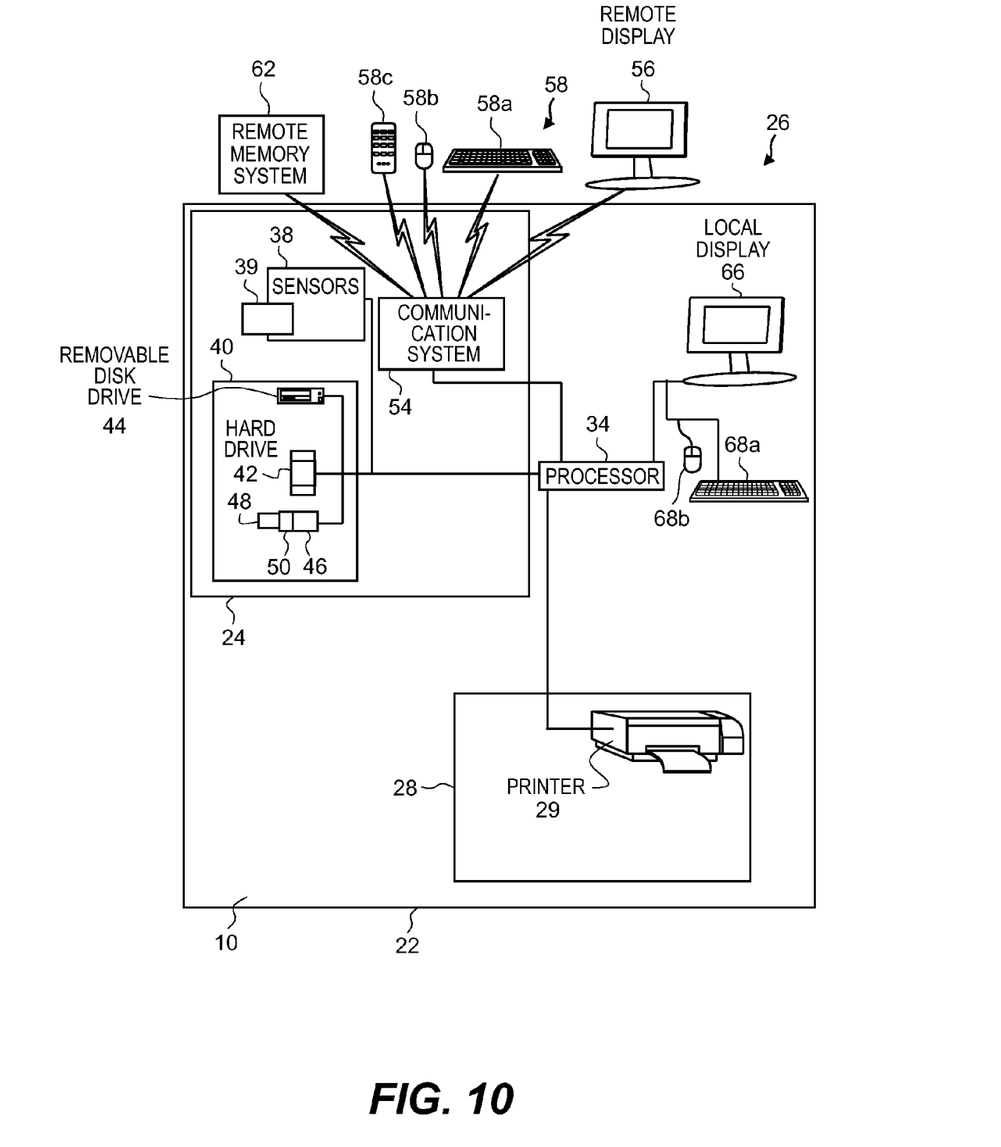
FIG. 10 is an illustration of an embodiment of a computer system useful in various embodiments of the present invention.

As shown in FIG. 10 in more detail and according to another embodiment of the present invention, a computer system for coding and decoding codes, printing codes, reading codes, and presenting code information includes a electronic computer system 20, for example a computer server. The electronic computer system 20 is connected to a remote electronic computer system 35, for example a remote client computer, through a computer network, the electronic computer system 20 including memory 40. The remote electronic computer system 35 can have a display 66 (e.g. corresponding to display 354) for displaying code information or otherwise providing a user interface.

FIG. 10 illustrates an embodiment of an electronic computer system 20, for example a computer, which is used in generating and printing codes. In the embodiment of FIG. 10, the electronic computer system 20 includes a source of content data files 24, a user input system 26 and an output system 28 connected to a processor 34. The source of content data files 24, user-input system 26 or output system 28 and processor 34 is positioned within a housing 22 as illustrated. In other embodiments, circuits and systems of the source of content data files 24, user input system 26 or output system 28 are positioned in whole or in part outside of housing 22.

The source of content data files 24 can include any form of electronic or other circuit or system that can supply digital data to processor 34 from which processor 34 can derive images that is printed with codes. In this regard, the content data files 24 can include, for example and without limitation, still images, image sequences, video graphics, computer-generated images, and image metadata. Source of content data files 24 can optionally capture images to create content data for use in content data files 24 by use of capture devices located at, or connected to, electronic computer system 20 or can obtain content data files that have been prepared by or using other devices such as the remote electronic computer system 35. In the embodiment of FIG. 10, source of content data files 24 includes sensors 38, the memory 40 and a communication system 54.

Sensors 38 are optional and can include light sensors, biometric sensors and other sensors known in the art that is used to detect conditions in the environment of electronic computer system 20 and to convert this information into a form that is used by processor 34 of electronic computer system 20. Sensors 38 can also include one or more image sensors 39 that are adapted to capture still or video images. Sensors 38 can also include biometric or other sensors for measuring involuntary physical and mental reactions such sensors including, but not limited to, voice inflection, body movement, eye movement, pupil dilation, body temperature, and p4000 wave sensors.

Memory 40 can include conventional memory devices including solid-state, magnetic, optical or other data-storage devices. Memory 40 is fixed within electronic computer system 20 or it is removable. In the embodiment of FIG. 10, electronic computer system 20 is shown having a hard drive 42, a disk drive 44 for a removable disk such as an optical, magnetic or other disk memory (not shown) and a memory card slot 46 that holds a removable memory 48 such as a removable memory card and has a removable memory interface 50 for communicating with removable memory 48. Data including, but not limited to, control programs, digital images and metadata can also be stored in a remote memory system 52 such as the remote electronic computer system 35, a personal computer, computer network or other digital system. Remote memory system 52 can also include solid-state, magnetic, optical or other data-storage devices.

In the embodiment shown in FIG. 10, electronic computer system 20 has a communication system 54 that in this embodiment is used to communicate with remote electronic computer systems 35 for example including an optional remote memory system 52, an optional remote display 56, or optional remote input 58. The optional remote memory system 52, optional remote display 56, and optional remote input 58 can all be part of the remote electronic computer system 35 having the remote input 58 with remote input controls, and that can communicate with communication system 54 wirelessly as illustrated or can communicate in a wired fashion. In an alternative embodiment, a local input station including either or both of the local display 66 and local input controls 68 (also referred to herein as "local user input 68") is connected to communication system 54 using a wired or wireless connection.

Communication system 54 can include for example, one or more optical, radio frequency or other transducer circuits or other systems that convert image and other data into a form that is conveyed to a remote device such as the remote memory system 52 or the remote display 56 using an optical signal, radio frequency signal or other form of signal. Communication system 54 can also be used to receive a digital image and other data from a host or server computer or network (not shown), the remote memory system 52 or the remote input 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system. In one useful embodiment, the electronic computer system 20 can provide web access services to remote electronic computer systems 35 that access the electronic computer system 20 through a web browser. Alternatively, the remote electronic computer system 35 can provide web services to electronic computer system 20 depending on the configurations of the systems.

User input system 26 provides a way for a user 72 of electronic computer system 20 to provide instructions to processor 34. This permits the user 72 to make a designation of content data files to be used in generating an image-enhanced output product and to select an output form for the output product. User input system 26 can also be used for a variety of other purposes including, but not limited to, permitting the user 72 to arrange, organize and edit content data files to be incorporated into the image-enhanced output product, to provide information about the user or audience, to provide annotation data such as voice and text data, to identify characters in the content data files, and to perform such other interactions with electronic computer system 20 as are described herein.

In this regard user input system 26 can include any form of transducer or other device capable of receiving an input from the user 72 and converting this input into a form that is used by processor 34. For example, user input system 26 can include a touch screen input, a touch pad input, a 4-way switch, a 6-way switch, an 8-way switch, a stylus system, a trackball system, a joystick system, a voice recognition system, a gesture recognition system a keyboard, a remote control or other such systems. In the embodiment shown in FIG. 10, user input system 26 includes the optional remote input 58 including a remote keyboard 58a, a remote mouse 58b, and a remote control 58c and the local user input 68 including a local keyboard 68a and a local mouse 68b.

Remote input 58 can take a variety of forms, including, but not limited to, the remote keyboard 58a, remote mouse 58b or remote control 58c illustrated in FIG. 10. Similarly, local user input 68 can take a variety of forms. In the embodiment of FIG. 10, local display 66 and local user input 68 are shown directly connected to processor 34.

Figure 11:
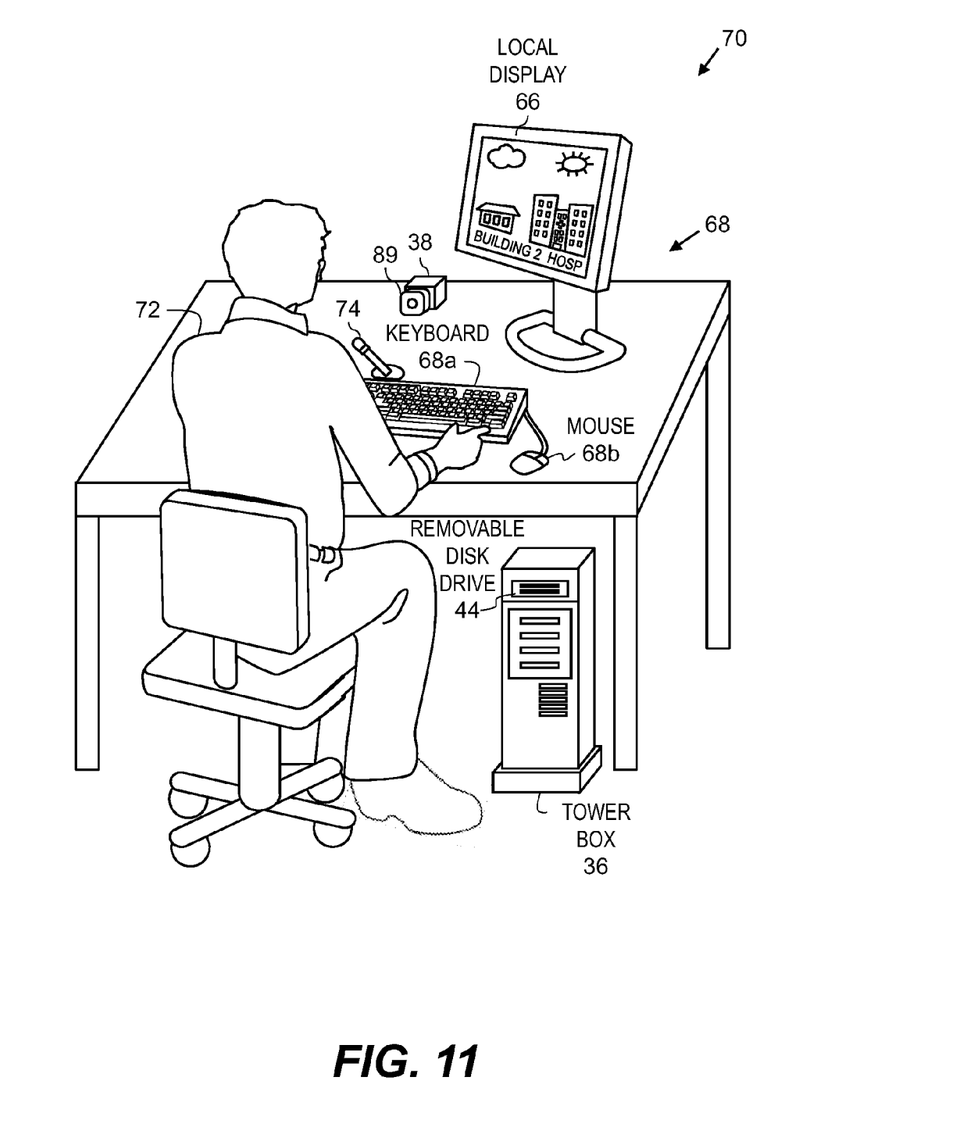
FIG. 11 is an illustration of an embodiment of a desktop computer, work station, or kiosk that is used in a system of FIG. 10.

As is illustrated in FIG. 11 local user input 68 can take the form of an editing area 70 such as a home computer, an editing studio, or kiosk that can also be a stand-alone computer system with the processor 34 and local disk drive 44 or other memory or the remote electronic computer system 35. In this illustration, the user 72 is seated before a console including local keyboard 68a and mouse 68b and the local display 66 which is capable, for example, of displaying multimedia content, for example in a graphic user interface. As is also illustrated in FIG. 11, editing area 70 can also have sensors 38 including, but not limited to, image sensors 39, audio sensors 74 and other sensors such as multispectral sensors that can monitor user 72 during a production session or provide other information such as images.

Output system 28 (FIG. 10) is used for rendering images, text, codes, or other graphical representations. In this regard, output system 28 can include any conventional structure or system that is known for printing or recording images on an output device 32 including, but not limited to, printer 29. Printer 29 can record images or codes on a tangible surface 30 using a variety of known technologies including, but not limited to, conventional four-color offset separation printing or other contact printing, silk screening, dry electrophotography such as is used in the NexPress 2100 printer sold by Eastman Kodak Company, Rochester, N.Y., USA, thermal printing technology, drop-on-demand inkjet technology and continuous inkjet technology. For the purpose of the following discussions, printer 29 will be described as of a type that generates color images. It will be appreciated that this is not necessary and that the claimed methods and apparatuses herein are practiced with the printer 29 that prints monotone images such as black and white, grayscale, or sepia toned images. As will be readily understood by those skilled in the art, the electronic computer systems 20, 35, with which the user 72 interacts to define a user-personalized image product can be separated from the remote electronic computer system 35) connected to the printer 29, so that the specification of the image product is remote from its production.

In certain embodiments, the source of content data files 24, user input system 26 and output system 28 can share components.

Processor 34 operates electronic computer system 20 based upon signals from user input system 26, sensors 38, memory 40 and communication system 54. Processor 34 can include, but is not limited to, a programmable digital computer, a programmable microprocessor, a programmable logic processor, a series of electronic circuits, a series of electronic circuits reduced to the form of an integrated circuit, or a series of discrete components.

Figure 12:
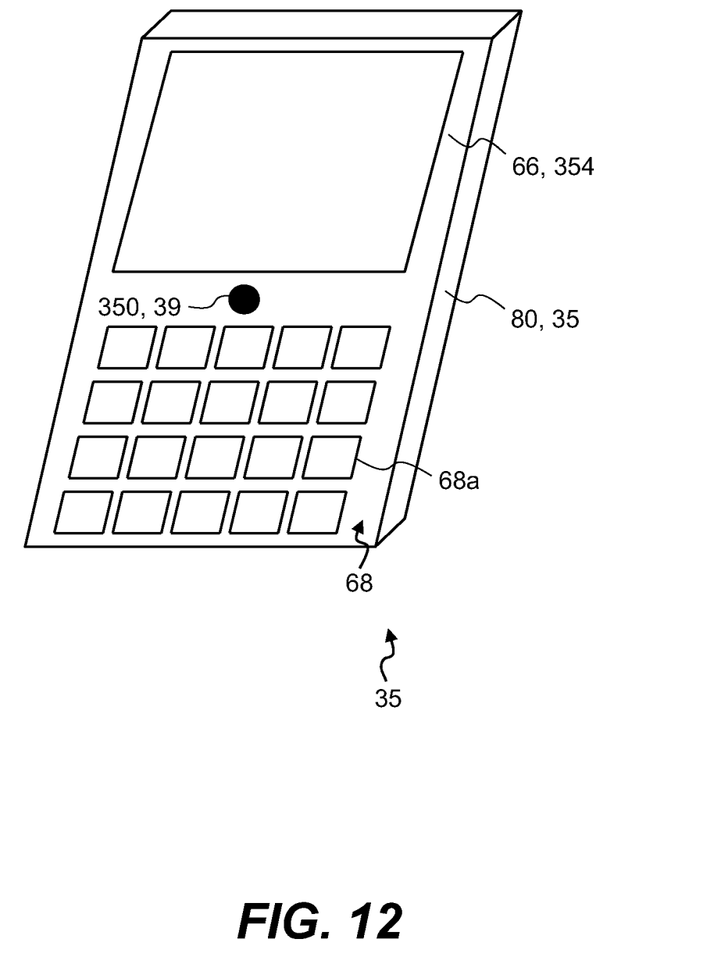
FIG. 12 is an illustration of an embodiment of a mobile communication device that is used in a system of FIG. 10.

In an embodiment of the present invention illustrated in FIG. 12, the remote electronic computer system 35 is a mobile communication device 80, for example a cellular telephone, a smart phone, or a wirelessly connected hand-held computer such as a tablet computer. The mobile communication device 80 can include the display 66 or a user-input system incorporating the local input 68, keyboard 68a and the image reader 350 (for example, a digital camera with image sensor 39). The image reader 350 can have a variable focus or variable zoom lens, for example to capture images at different resolutions and distances (D1 and D2). Microscopic lenses can be included. In another embodiment, the local input 68 device can be a touch screen. The mobile communication device 80 can communicate with electronic computer system 20 directly, for example through a wireless local area network or a point-to-point wireless connection, or indirectly through a cellular telephony network. The electronic computer system 20 can be a computer server, for example providing browser-based web pages to a remote electronic computer system 35, 80. In particular, the mobile communication device 80 can incorporate the image reader 350 (for example, a digital camera with image sensor 39) to enable image reading, the display 354 (corresponding to display 66) and a processor (not shown in FIG. 12). The mobile communication device 80 can correspond to a remote electronic computer system 35, or a standalone computer system that provides the image reading (step 200), decoding (steps 205, 215), and presenting steps (step 220) useful in the present invention and illustrated in FIG. 7. The electronic computer system 20 of FIG. 8 is useful for receiving information, encoding the information, and outputting (e.g. by printing) the information in conjunction with other printed material such as images or graphic information.

Any one of the electronic computer system 20, remote electronic computer system 35, or the mobile communication device 80 can execute software programs on the internal processor 34. The software programs can interact with the user 72 through a user interface (e.g. local display 66 and local input 68) or with remote computers to accomplish the programmed task. The software programs can execute algorithms to analyze data (e.g. digital image files) or to compute useful values. A computer software program product can include one or more non-transitory, tangible, computer readable storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM); or any other physical device or media employed to store a computer program having instructions for controlling one or more computers to practice the present invention.

The invention has been described in detail with particular reference to certain embodiments thereof, but it will be understood that variations and modifications can be effected within the spirit and scope of the invention.

PARTS LIST

A, B enlarged portion view
D1 first distance
D2 second distance
1 machine-readable optical code
5 two-dimensional code, QR code, matrix bar code
6 dark elements
7 light elements
8 graphic elements
20 electronic computer system
22 housing
24 source of content data files
26 user input system
28 output system
29 printer
30 tangible surface
32 output device
34 processor
35 remote electronic computer system
38 sensors
39 image sensors
40 memory
42 hard drive
44 disk drive
46 memory card slot
48 removable memory
50 memory interface
52 remote memory system
54 communication system
56 remote display
Parts List Cont'd
58 remote input
58a remote keyboard
58b remote mouse
58c remote control
66 local display
68 local input
68a local keyboard
68b local mouse
70 editing area (home computer, editing studio, or kiosk)
72 user
74 audio sensors
80 mobile communication device
100 provide substrate step
101 receive information step
102 encode information step
105 form code on substrate step
106 print first code at fast rate step
107 print second code at slow rate step
110 locate second code in first element location step
120 peripheral system
130 user interface system
140 data storage system
150 data processing system
200 record first code step
205 decode first code step
210 record second code step
215 decode second code step
220 present decoded information step
310 first code
312 first element
Parts List Cont'd
315 substrate
320 second code
320A second code
322 second element
330 third code
332 third element
340 billboard
350 image reader (digital camera)

352 processor and user interface
354 display

The invention claimed is:

1. A machine-readable optical code formed on a substrate, comprising:
   a first code including a plurality of first elements formed on or in the substrate, each first element having either a light state or a dark state, and the first code specifying first information;
   wherein two or more adjacent and contiguous first elements includes a second code on or in the substrate, the second code including a plurality of second elements specifying second information, each of the one or more first elements including at least some second elements of the second code, the second elements of each one or more first elements having an aggregate lightness or darkness determining the light state or dark state of the corresponding first element; and
   wherein the first code and the second code are machine-readable optical codes.

2. The machine-readable optical code of claim 1, wherein the substrate is a printable substrate and the first and second codes and the first and second elements are printed on the substrate.

3. The machine-readable optical code of claim 1, further including a display, and wherein the substrate is a part of the display and the first and second codes and the first and second elements are displayed on the display.

4. The machine-readable optical code of claim 1, wherein the second code is a single one of the first elements.

5. The machine-readable optical code of claim 1, wherein the second code is formed from a plurality of contiguous first elements.

6. The machine-readable optical code of claim 1, further including a plurality of second codes in or on the substrate each second code formed from a different one or more first elements.

7. The machine-readable optical code of claim 1, further including a third code including third elements formed on or in the substrate, the third code specifying third information, wherein the third code is a machine-readable optical code including one or more second elements.

8. The machine-readable optical code of claim 1, wherein the first code uses the same code format as the second code.

9. The machine-readable optical code of claim 1, wherein the second code has a higher resolution than the first code.

10. The machine-readable optical code of claim 1, wherein the second information is related to the first information.

11. The machine-readable optical code of claim 1, wherein both the first code and the second code are visually perceptible.

12. The machine-readable optical code of claim 1, wherein the first code is visually perceptible and machine readable at a first distance and the second code is visually perceptible and machine readable at a second distance less than the first distance.

13. The machine-readable optical code of claim 1, wherein the first code is visually perceptible and the second code is not visually perceptible.

14. The machine-readable optical code of claim 13, wherein the second code is microscopic.

15. The machine-readable optical code of claim 1, wherein the substrate is a poster substrate or a billboard substrate.

16. The machine-readable optical code of claim 1, wherein the first code is a one-dimensional barcode, a two-dimensional matrix barcode, or a QR code or wherein the second code is a one-dimensional barcode, a two-dimensional matrix barcode, or a QR code.

17. The machine-readable optical code of claim 1, wherein the first code is printed in association with an image and the first or second information is relevant to the image.

18. The machine-readable optical code of claim 17, wherein the first or second information is provided by image metadata.

19. A method of making machine-readable optical code formed on a substrate, comprising:
   forming a first machine-readable optical code including a plurality of first elements on or in the substrate, each first element having either a light state or a dark state, and the first machine-readable optical code specifying first information; and
   forming two or more adjacent and contiguous first elements as a second machine-readable optical code on or in the substrate, the second machine-readable optical code including a plurality of second elements specifying second information, each of the one or more first elements including at least some second elements of the second machine-readable optical code, the second elements of each one or more first elements having an aggregate lightness or darkness determining the light state or dark state of the corresponding first element.

20. The method of claim 19, further including printing the first elements and second elements on the substrate with the same printing device, and printing the first elements at a first rate and printing the second elements at a second rate slower than the first rate.

21. The method of claim 19, further including printing the first elements at a first resolution and printing the second elements at a second resolution greater than the first resolution.

22. The method of claim 19, wherein the second code has an overall lightness or darkness and further including locating the second code in first element(s) for which the overall lightness or darkness is matched to the lightness or darkness of the first element(s).

* * * * *